Dec. 27, 1949     L. F. KEENE     2,492,483
EJECTING MEANS FOR MOLDING APPARATUS
Filed Aug. 8, 1947
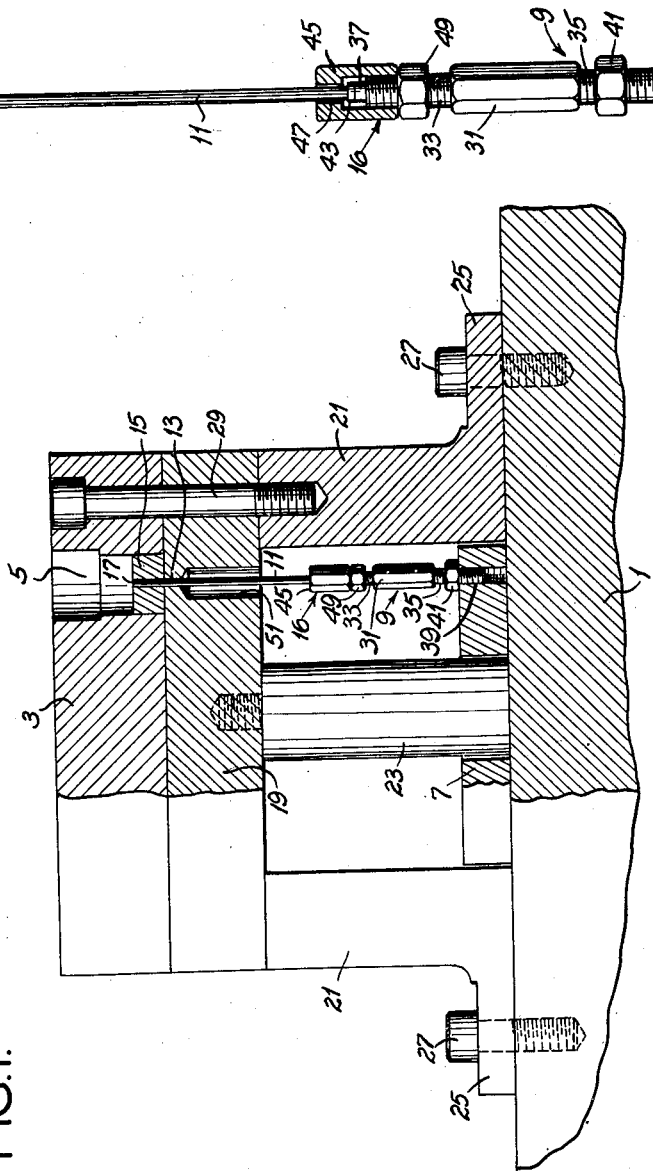

Patented Dec. 27, 1949

2,492,483

UNITED STATES PATENT OFFICE 2,492,483

EJECTING MEANS FOR MOLDING APPARATUS

Lester F. Keene, Revere, Mass.

Application August 8, 1947, Serial No. 767,480

11 Claims. (Cl. 18—42)

This invention relates to ejecting means for molding apparatus, more particularly to means embodying an ejector pin for ejecting a molded article from the mold of a molding press or the like.

Among the several objects of the invention may be noted the provision of an improved ejecting means for molding apparatus including an ejector pin adapted to be driven into a mold to eject a molded article therefrom; the provision of ejecting means of the class described wherein the ejector pin is readily axially adjustable relative to the mold to such position that it will not cause marring during molding of the molded product; the provision of ejecting means of this class wherein the ejector pin is also readily laterally adjustable so that it may be properly aligned with the mold; and the provision of ejecting means of this class adapted for convenient removal and replacement of ejector pins if they should be broken or bent. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a view partly in elevation and partly in section of a unit of a molding press embodying the improved ejecting means of this invention; and, Fig. 2 is an enlarged view partly in elevation and partly in section of the ejecting means per se.

Referring to the drawing, the bed of a molding apparatus (such as a molding press for pressure-molding articles of such materials as thermosetting resins) is designated 1 (Fig. 1). Spaced above the bed of the press is a mold 3, specifically a horizontally disposed plate having a mold cavity 5 wherein a charge of material is molded under heat and pressure into an article of the configuration of the cavity. A so-called knockout bar 7 is movable from a retracted position on the bed 1 upward toward the mold 3. Adjustably fixed in the bar is a stud 9 which extends upward toward the cavity. The stud 9 carries an ejector pin 11 which extends upward from the stud through an aperture 13 in the bottom wall 15 of the mold cavity 5.

The pin is detachably coupled to the upper end of the stud preferably by a self-aligning coupling 16, to be described, whereby the pin may be accurately coaxially aligned with aperture 13. The stud is vertically adjustable in bar 7 so that the upper end 17 of the ejector pin 11 may be positioned flush with the internal surface of the bottom wall 15 of cavity 5, as illustrated in Fig. 1.

As illustrated, the mold 3 is disposed upon a heating platen 19, heated in any suitable known manner, for heating the charge of material to be molded. The mold and platen are supported above the bed of the press at their sides upon supports 21 and centrally by one or more posts 23. The side supports 21 have outwardly extending flanges 25 resting on the bed of the press. Bolts 27 extend through the flanges and are removably threaded into the bed. The mold 3 and platen 19 are retained in fixed position upon the side supports by bolts 29 removably threaded into the side supports. The bar 7 is vertically movable in the space between the side supports and preferably has sliding bearing on the center post or posts 23, as illustrated, whereby the bar is guided in its vertical movement.

The stud 9 has an intermediate portion 31 of hexagonal or other suitable cross section for application of a tool for turning it. The upper and lower ends 33 and 35 of the stud are threaded. The upper end 33 of the stud preferably has an axial extension 37 of reduced diameter. The lower end 35 of the stud is adjustably threaded into a socket 39 in bar 7. A lock nut 41 is threaded on 35 to lock the stud in axially adjusted position.

The ejector pin 11 has a head 43 on its lower end engaging the end of stud extension 37. This head is of substantially the same diameter as the diameter of the extension and forms one element of the self-aligning coupling 16. The other element of the coupling comprises a coupling nut 45 removably threaded on the upper end 33 of the stud and having an inwardly directed flange 47 extending over the head 43 of the pin. The head 43 of the pin has a loose fit within the coupling nut and the pin has a loose fit within flange 47 of the nut so that the pin is laterally adjustable relative to the stud when the nut is backed off. A lock nut 49 is threaded on the upper end 33 of the stud for locking the coupling nut in adjusted position on the stud.

The ejector pin 11 extends through a recess 51 in the platen 19 adapted to receive the coupling nut 45 when knock-out bar 7 is moved upward. The aperture 13 in the bottom wall of the mold cavity 5 is continued through the platen to the recess 51.

The above-described arrangement is such that with bar 7 in its retracted position, the upper end 17 of the ejector pin 11 may be positioned flush with the internal surface of the bottom wall 15 of the mold cavity 5. This is accomplished by loosening lock nut 41 and turning the stud 9 to raise or lower the pin to the proper elevation. The lock nut 41 is then threaded down on the stud into engagement with bar 7 to lock the stud in adjusted position. With the upper end of the ejector pin so positioned, the molded article will not be marred by dents, which would result if the pin projected into the mold cavity, or by protuberances, which would result if the upper end 17 of the pin were below the bottom of the cavity.

Also, any misalignment of the stud 9 and the aperture 13 in the bottom wall of the cavity is compensated for by the self-aligning coupling 16. Thus, ejector pin 11 may be accurately coaxially aligned with the aperture 13, so that it will not cause excessive wear. Alignment is effected by loosening the coupling nut 45 to permit lateral adjustment of the pin relative to the stud. This may be accomplished either by backing off coupling nut 45 and locking it in backed-off position by means of lock nut 49 to afford the pin continual freedom for lateral adjustment, or by initially making any necessary lateral adjustment of the pin relative to the stud and locking the pin tightly in adjusted position by means of the coupling nut. By "tightly" is meant immovably, so that once lateral adjustment is made, it is thereafter maintained.

Also, replacement of a broken or bent pin is readily accomplished without any substantial disassembly of the molding apparatus. Access to the ejecting means is readily attained by withdrawing bolts 27 and 29 from one of the side supports 21 (as, for example, the righthand support 21 in Fig. 1) and removing it. The mold 3 and platen 19 remain fixed on the other side support and the center post or posts 23. Lock nut 49 is backed off from the coupling nut 45 and the latter is threaded off the upper end 33 of stud 9. This disengages the pin 11 from the stud. Several different procedures may be followed in removing the pin, as follows:

If the pin has been broken, its parts may usually be removed by sliding the coupling nut 45 upward on the lower part of the pin to clear the upper end of stud 9 and withdrawing this part and the nut laterally. The upper part of the pin will then either drop out of aperture 13 or may be easily driven downward out of the aperture.

If the pin has been bent, it may be removed by sliding the nut 45 upward on the pin to clear the upper end of the stud, then canting the pin laterally out of alignment with the stud and pulling it downward out of aperture 13. This second mode of removal is facilitated if the pin has a somewhat loose fit in aperture 13.

A third mode of removing the pin is to thread the stud 9 entirely out of socket 39, slide coupling nut 45 upward to clear the stud, and then withdraw the stud laterally. The pin thereupon drops downward out of aperture 13 and may be easily laterally removed.

A new pin 11 may be inserted by reversing the procedure of the second mode of removal if the new pin has a sufficiently loose fit in aperture 13 to be canted sufficiently to be inserted in the aperture. Otherwise, the pin may be inserted by reversing the procedure of the third mode of removal. When the new pin has been inserted, the stud 9 is vertically adjusted to position the upper end of the pin flush with the internal surface of the bottom wall 15 of mold cavity 5. Since the pin is loosely coupled to the stud by the self-aligning coupling 16, it is automatically properly aligned coaxially in aperture 13. Coupling nut 45 may be either threaded down as far as it may be turned to clamp the pin, or may be only partly threaded down so that the pin remains loosely coupled to the stud, as previously described.

It will be understood that, in the operation of the molding apparatus, the bar 7 remains in retracted position during the molding operation. When the molding operation has been completed, bar 7 is moved upward to drive the ejector pin 11 through the mold so that the upper end 17 of the pin engages the molded article and ejects it upward from the mold cavity 5.

It will be further understood that while only one mold cavity 5 and only one ejector pin 11 have been shown, the apparatus may have a plurality of cavities and a plurality of pins, for simultaneously ejecting articles from the cavities, carried by the knock-out bar 7. Only one unit of a multi-unit molding apparatus has been illustrated herein since other units are the same.

While the coupling 16 has been illustrated herein as a self-aligning coupling permitting lateral adjustment of the ejector pin 11 relative to the stud, some of the objects of the invention may be attained even if the head 43, after alignment is tightened down by the flange 47 of the coupling nut 45. Thus, the pin may be axially adjusted as described and readily removed and replaced though not self-aligning.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. In molding apparatus, a mold, an ejector pin slidable through an aperture in the mold, a member movable from a retracted position toward the mold for driving the pin through the mold so that an end of the pin may engage an article in the mold to eject it therefrom, a stud, one end of which is mounted for axial adjustment in said member, and which extends toward the mold, said pin extending from the other end of the stud toward the mold and through said aperture, and a self-aligning coupling for detachably retaining the pin coupled to said other end of stud, the latter being axially adjustable in said member to position the article-engaging end of the pin flush with the mold when said member is in its retracted position, the self-aligning coupling permitting lateral adjustment of the pin relative to the stud and mold to position the pin in substantially coaxial alignment with the aperture in the mold, said self-aligning coupling including means for clamping said ejector pin and stud tightly together to prevent both lateral and axial movement of said pin relative to said stud.

2. In molding apparatus, a bed, a mold having a mold cavity therein, said cavity opening upward and having a bottom wall, means for supporting said mold spaced above the bed, a horizontal bar mounted for vertical reciprocation between said bed and mold and having a retracted position resting on the bed, a stud mounted for vertical adjustment in the bar and extending upward toward the cavity, an ejector pin extending upward from the upper end of the stud through an aperture in the bottom wall of the cavity, and means for removably retaining the pin assembled with the stud at the upper end of the latter, said means including means for clamping said pin tightly to the stud to prevent both axial and lateral movement thereafter between the pin and the stud.

3. In molding apparatus as set forth in claim 2, said last-named means comprising a self-aligning coupling permitting lateral adjustment of the pin relative to the stud and the mold, prior to clamping the pin and the stud tightly together, and preventing loss of said lateral adjustment after clamping the pin and stud tightly together.

4. In molding apparatus, a bed, a mold having a mold cavity therein, said cavity opening upward and having a bottom wall, means for supporting said mold spaced above the bed, a horizontal bar mounted for vertical reciprocation between said bed and mold and having a retracted position resting on the bed, a stud having its lower end adjustably threaded into the bar and extending upward toward the cavity, an ejector pin extending upward from the upper end of the stud through an aperture in the bottom wall of the cavity, said pin having a head on its lower end engaging the upper end of the stud, and a coupling nut surrounding the pin and its head and removably threaded on the upper end of the stud for detachably retaining the pin assembled therewith, said nut being adapted to be screwed onto said stud far enough to clamp tightly said head to the said upper end of the stud.

5. In molding apparatus as set forth in claim 4, said pin extending loosely through the nut and its head having a loose fit within the nut so that it is laterally adjustable relative to the stud, prior to clamping said head tightly to the upper end of the stud.

6. Ejector means for molding apparatus comprising a stud having threaded ends and an intermediate portion formed for application of a tool for turning the stud, an ejector pin having a head at one end engaged with one end of said stud, and a coupling nut removably threaded on said one end of the stud and having a flange extending over the head of the pin for retaining the pin in assembly with the stud and for clamping said head tightly to the stud.

7. Ejector means as set forth in claim 6 wherein the pin extends loosely through the flange and its head has a loose fit within the nut so that the pin is laterally adjustable relative to the stud, prior to clamping said head to the stud.

8. In molding apparatus, a mold, an ejector pin slidable through an aperture in the mold, a member movable from a retracted position toward the mold for driving the pin through the mold so that an end of the pin may engage an article in the mold to eject it therefrom, a stud, one end of which is adjustably threaded into said member, and which extends toward the mold, said pin having a head engaging the other end of the stud and extending therefrom toward the mold and through said aperture, and a coupling nut threaded on said other end of the stud for retaining the pin removably assembled with the stud, the latter being axially adjustable in said member to position the article-engaging end of the pin flush with the mold when said member is in its retracted position, said pin extending loosely through the coupling nut and its head having a loose fit within the nut so that it is laterally adjustable relative to the stud and mold to be positioned in substantially coaxial alignment with the aperture in the mold, said nut being adapted to be screwed onto said stud to clamp tightly together said head and the stud after the lateral adjustment has been made.

9. In molding apparatus, a mold, an ejector pin slidable through an aperture in the mold, a member movable from a retracted position toward the mold for driving the pin through the mold so that an end of the pin may engage an article in the mold to eject it therefrom, axially adjustable means for mounting the pin on said member whereby the pin is axially adjustable to position its article-engaging end flush with the mold when said member is in its retracted position, and means mounted on said mounting means for clamping said ejector pin and said mounting means tightly together to prevent both lateral and axial movement of said pin relative to said mounting means.

10. Ejector means for molding apparatus comprising an ejector pin and an extension thereof, said pin and said extension being separable from each other, and means for tightly clamping said pin and said extension together at the point of separation, said means permitting lateral adjustment of said pin relative to said extension prior to said clamping and preventing loss of said lateral adjustment after clamping.

11. Ejector means for molding apparatus comprising a stud having a threaded end, an ejector pin having a shank portion and an enlarged head portion in engagement with the threaded end of the stud, and a retainer element in screw thread engagement with said threaded end of the stud, said retainer element fitting loosely over said shank portion and engaging said head portion between it and the stud to clamp the pin tightly in assembly with the stud, whereby said pin may be adjusted laterally with respect to said stud and said lateral adjustment may be maintained after it has been made.

LESTER F. KEENE.

REFERENCES CITED

The following references are of record in the file of this patent:

UNITED STATES PATENTS

| Number | Name | Date |
|---|---|---|
| 1,493,469 | Candler | May 13, 1924 |
| 1,611,869 | Anderson, A. | Dec. 28, 1926 |
| 2,217,661 | Anderson, D. M. | Oct. 15, 1940 |
| 2,227,966 | Emsley | Jan. 7, 1941 |